(12) United States Patent
McGill

(10) Patent No.: US 6,858,055 B2
(45) Date of Patent: Feb. 22, 2005

(54) BOTTOM LOADING CLEAN ROOM AIR FILTER SUPPORT SYSTEM

(76) Inventor: Joseph A. McGill, 3310 E. Yorba Linda Blvd., Suite 425, Fullerton, CA (US) 92831

( * ) Notice: Subject to any disclaimer, the term of this patent is extended or adjusted under 35 U.S.C. 154(b) by 0 days.

(21) Appl. No.: 10/466,954

(22) PCT Filed: Feb. 1, 2001

(86) PCT No.: PCT/US01/03359

§ 371 (c)(1), (2), (4) Date: Jul. 22, 2003

(87) PCT Pub. No.: WO02/060560

PCT Pub. Date: Aug. 8, 2002

(65) Prior Publication Data

US 2004/0065064 A1 Apr. 8, 2004

(51) Int. Cl.[7] .................................................. E06B 3/54
(52) U.S. Cl. ........................ 55/385.2; 55/DIG. 29; 55/DIG. 31; 454/187; 454/293; 454/294
(58) Field of Search ..................... 55/385.2, DIG. 29, 55/DIG. 31; 454/187, 293, 294

(56) References Cited

U.S. PATENT DOCUMENTS

| | | | | |
|---|---|---|---|---|
| 4,776,263 A | * | 10/1988 | Lokander et al. | ........... 454/293 |
| 4,946,484 A | * | 8/1990 | Monson et al. | ............ 55/385.2 |
| 5,279,090 A | * | 1/1994 | Yamaguchi et al. | ...... 52/506.08 |
| 5,613,759 A | * | 3/1997 | Ludwig et al. | ............. 362/149 |
| 5,865,674 A | * | 2/1999 | Starr | .......................... 454/187 |
| 5,871,556 A | * | 2/1999 | Jeanseau et al. | ........... 55/385.2 |
| 5,958,114 A | * | 9/1999 | Sunahara et al. | ............. 96/417 |
| 6,371,846 B1 | * | 4/2002 | Powell et al. | ............... 454/271 |
| 6,497,739 B2 | * | 12/2002 | McGill | ...................... 55/385.2 |

* cited by examiner

Primary Examiner—Minh-Chau T. Pham
(74) Attorney, Agent, or Firm—James G. O'Neill, Klein, O'Neill & Singh, LLP

(57) ABSTRACT

An air filter support system for a clean room has a number of filter support elements (10) supported by holding rods (12) secured to a supporting surface. A connector/hanger bracket (14) having a pair of perpendicular arms (20, 22) with apertures (24, 26, 28) formed therein is secured to each holding rod. Grid members (16, 18) are laterally secured to the perpendicular arms by securing elements (38, 62, 64) passing through openings (40, 66, 68). Each of the grid members include sealing gaskets (34, 36, 70, 72) on top surfaces thereof to seal between grid members and filter elements. Aerodynamically shaped light fixtures (42, 52) are secured to lower portions of the grid members (16) to provide non-turbulent air flow into the clean room, while grid members (18) are aerodynamically shaped to provide non-turbulent air flow into the clean room.

20 Claims, 3 Drawing Sheets

BOTTOM LOADING CLEAN ROOM AIR FILTER SUPPORT SYSTEM

FIELD OF THE INVENTION

This invention relates generally to air filter support systems, and more particularly, to an improved bottom loading supporting system for air filters for clean rooms.

DESCRIPTION OF RELATED ART

Clean rooms are commonly used in many industries, such as the electronic, medical and pharmaceutical industries, to reduce the number of particles in the air to specified limitations. In the most common approach, a layer of flat filters is suspended from a room ceiling or a sidewall, with the filters extending over the entire area of the ceiling or sidewall. Pressurized air is conducted from a blower through ducts or a plenum through the air filters into an open space in the clean room and then returned via outlets in the room. The filter elements are normally supported by supporting elements, such as a grid, which engages the entire peripheral frame of each filter element. In addition, it is necessary to have an air-sealing gasket or sealing gel positioned between the grid elements and the filter panel frames. Because the known grid support systems do not always work efficiently, numerous attempts have been made to provide improved filter systems and/or support systems for clean rooms.

U.S. Pat. No. 4,946,484 to Monson et al., U.S. Pat. No. 5,192,348 to Ludwig, U.S. Pat. No. 5,620,369 to Spransy et al. and U.S. Pat.5,687,527 to Bikard et al. show various clean room filter suspension systems in which arrays of filter units are supported by grid systems including gel sealants or sealing strips used to seal the filter units against unfiltered air leakage.

U.S. Pat. No. 5,871,556 to Jeanseau et al. discloses a clean room ceiling in which individual filter units are suspended solely by unshared suspension assemblies so as to be self supporting and readily installable and removable individually and free of grids and other multiple unit supporting expedients. The unshared suspension assemblies are mounted centrally of each filter unit between separate filter packs on each side of a divider.

However, it is still desirable to provide improved and simplified filter support systems for clean rooms.

SUMMARY OF THE INVENTION

The present invention provides clean room filter support systems that may be used in a ceiling or sidewall, and which are less costly, better performing and allow installation of any type of filter. The present invention provides more flexible support systems than any currently available, and includes a plurality of interconnected support elements comprising a grid system for supporting substantially any type of framed filter elements or panels. Additionally, aerodynamic light fixtures and airfoil frame means are preferably added to or formed as lower portions of the grid members. The present invention includes a plurality of spaced support elements that are suspended from a ceiling or other supporting surface, so as to support individual filter elements. Each support element includes a support rod and a unique connector/hanger bracket for supporting a plurality of grid members. Filter elements are easily installed or removed from the grid system from the bottom, or within the clean room. The present invention utilizes gaskets to seal against air leakage between adjacent grid members, and between grid members and filter elements.

The grid members of the present invention are fastened to connector/hanger brackets from below the plane of the face of filter elements/fan filter elements to allow for the installation and removal of filter elements/fan filter elements from the bottom or clean room side.

The grid members of the present invention may be one piece or split lengthwise into a pair of cooperating halves. A complete grid system may be comprised of one-piece grid members, split grid members, or a combination of both. Whatever the combination, each grid member or half grid member is individually installable or removable. This allows for the installation or removal of filter elements/fan filter elements without disturbing adjacent elements.

When completed, the grid members and light fixture elements of the present invention are airfoil-shaped to reduce grid-induced turbulence that would trap airborne contamination and reduce room cleanliness.

The grid members of the present invention will accept filters/fan filter elements from virtually any manufacturer.

Some grid members contain light fixtures and are slightly wider than others. These wider grid members provide a space to permit the passage of fire sprinkler piping, electrical conduit, or other items, through the system into the clean room below. The lamp of the light fixture beneath the grid member is shortened to create a space at either end to permit this.

It is, therefore, a general object of the present invention to provide an improved and simplified support system for an air filter system in a clean room. It is a particular object of the present invention to provide an improved and simplified clean room air filter support system comprised of a plurality of individual support elements or members. It is another particular object of the present invention to provide an improved and simplified clean room air filter support system comprised of support rods suspended from an overhead ceiling, or other support structure having unique connector/hanger brackets thereon to hold easily installable or removable grid elements or members for suspending filter elements inserted from inside a clean room.

These and other objects of the present invention are achieved by providing an air filter support system for an array of filter elements or panels. The support system includes a plurality of grid members held by spaced support rods secured to a ceiling or other support surface. A unique connector/hanger bracket is mounted on each support rod. Grid members are connected to each connector/hanger bracket for supporting filter elements having rigid frames with filter panels held therein. The grid members are laterally secured to the connector/hanger brackets on the spaced support rods by means of securing elements laterally inserted into openings in the connector/hanger brackets. The grid members include sealing gaskets on top surfaces thereof that cooperate with the filter elements. In the preferred embodiment of the invention, aerodynamically-shaped light fixtures are secured under some of the grid members while the rest of the grid members are aerodynamically-shaped in themselves.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved and simplified bottom loading air filter support system.

Turning now to the drawings, a preferred embodiment of a bottom loading air filter ceiling support system of the present invention will be described. However, it is to be understood that the air filter support system of the present invention could also be mounted on a sidewall.

Figure 1:
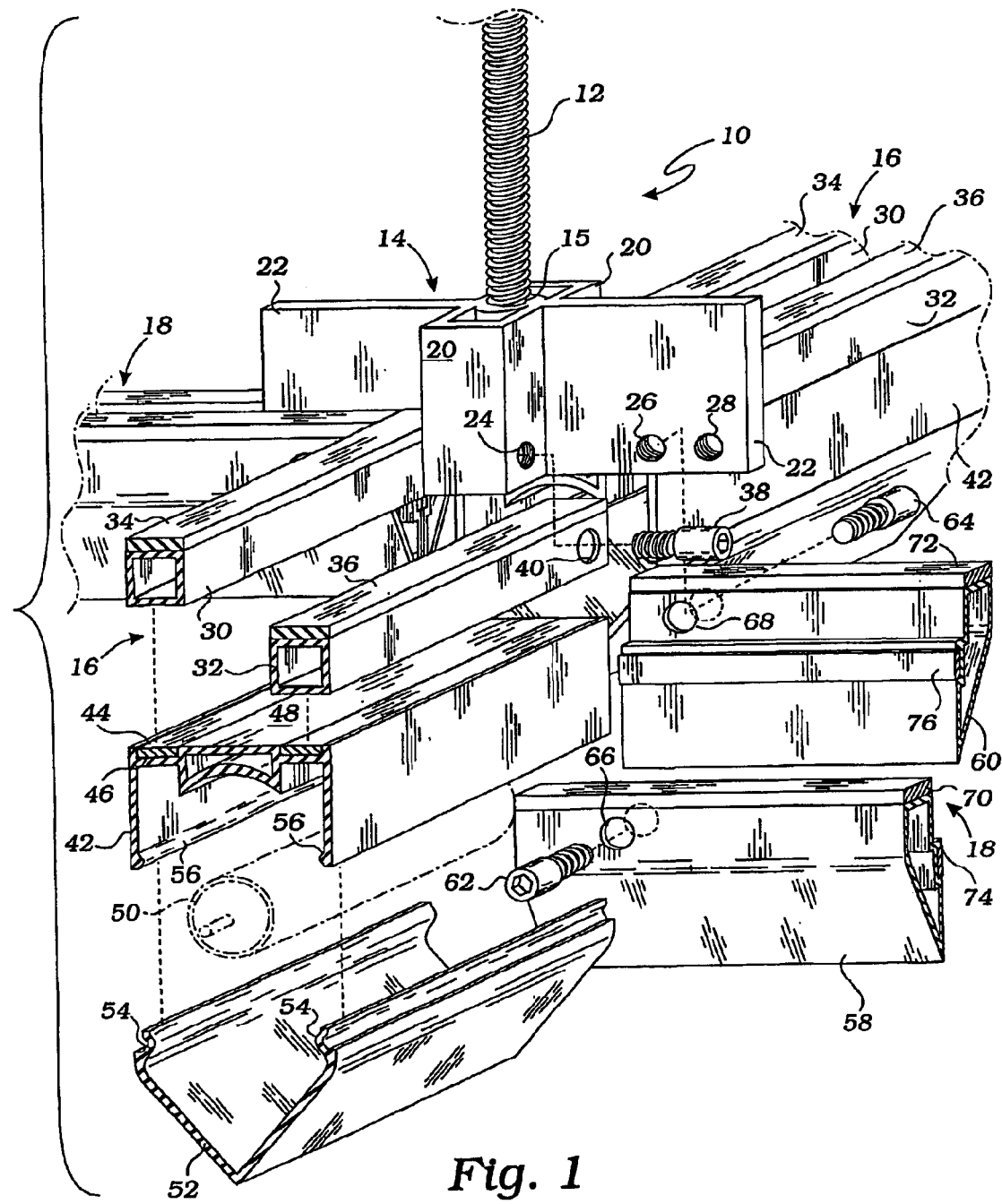
FIG. 1 is a partial exploded perspective view showing a supporting rod and connector/hanger bracket hung from a support surface and having a plurality of separate grid members for supporting an array of filter elements.
Figure 2:
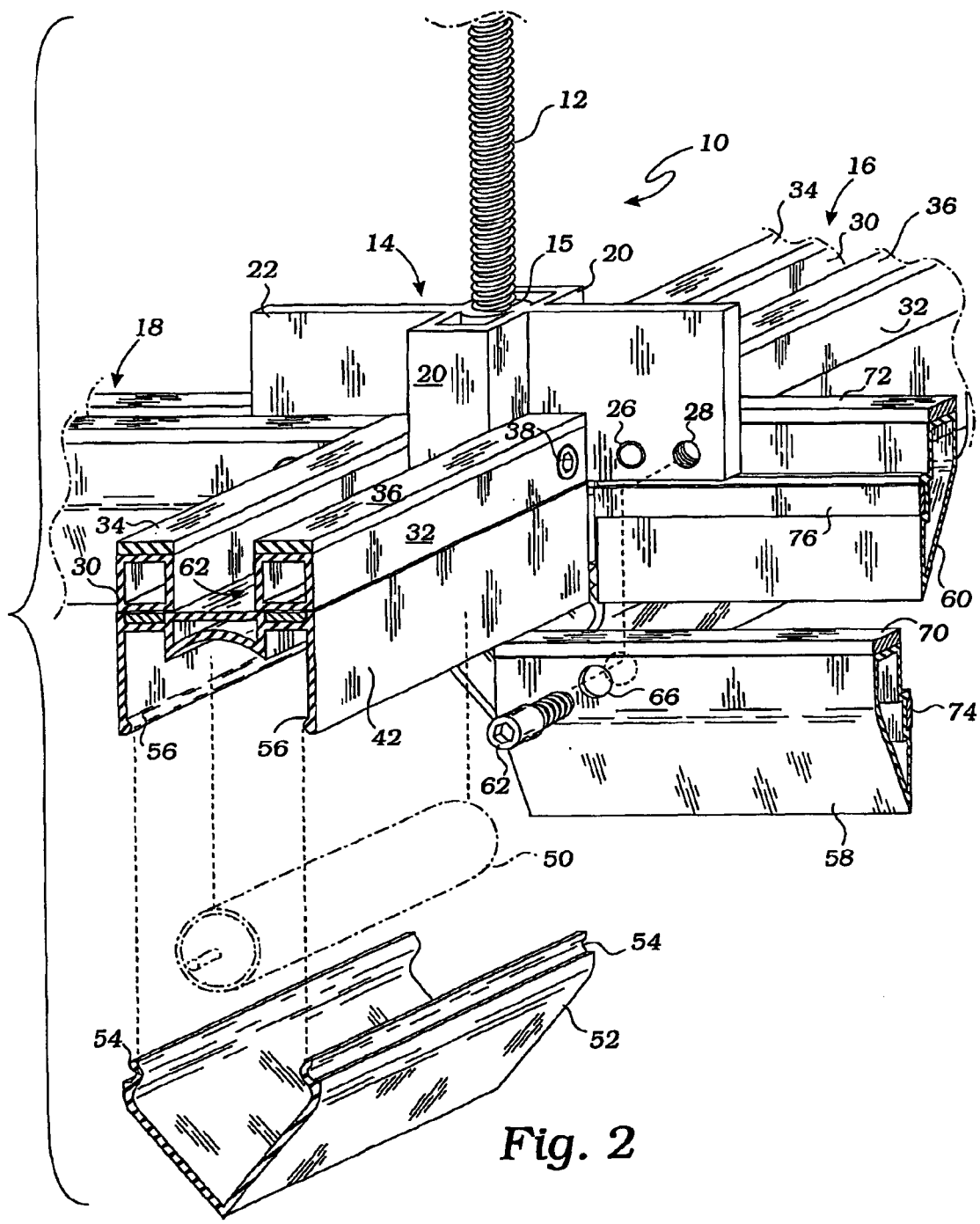
FIG. 2 is a further partial exploded perspective view showing the unique support system of the present invention.
Figure 3:
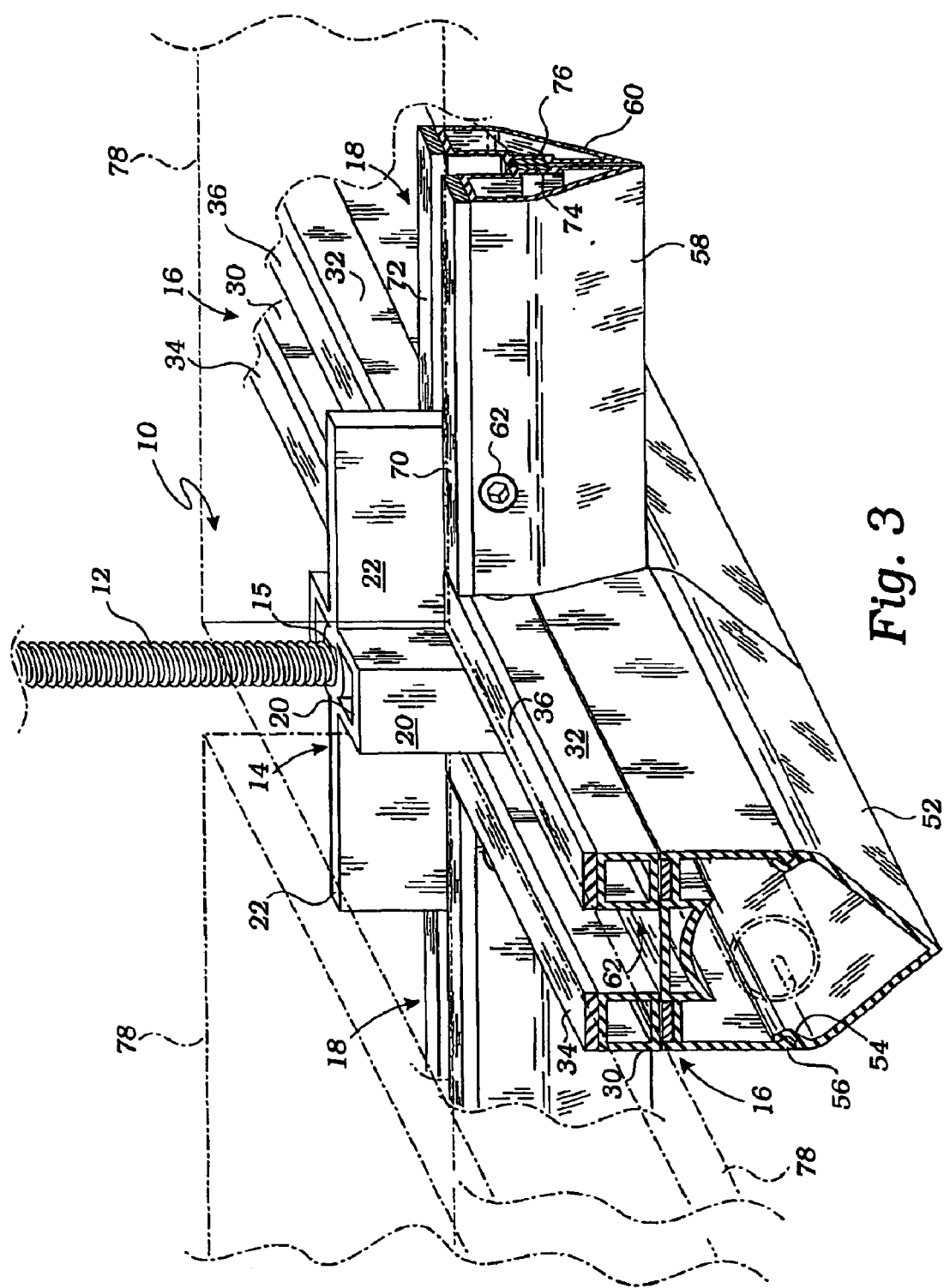
FIG. 3 is a further perspective view showing the air filter support system of the present invention in the fully assembled position, with a light fixture in position below one of the grid members, with aerodynamically-shaped grid members perpendicular thereto.

The bottom loading air filter support system of the present invention includes a plurality of individual, spaced apart support members 10 having threaded support rods 12, only one of which support members is shown for convenience. Each support rod 12 has a connector/hanger bracket 14 mounted thereon, as by being threaded into a central opening 15 in the connector/hanger bracket. The support rods 12 are suspended from a ceiling, or other support structure, and spaced apart so as to support adjacent filter elements 78 (see FIG. 3), by grid members or supporting elements 16, 18. The grid members 16, 18 may be formed as integral elements or may be split, or made in two or more pieces. The filter elements 78 preferably have frames which will be supported by the grid members 16.

Each of the connector/hanger brackets 14 include a plurality of arms 20, 22, which are preferably of different lengths and widths, extending at approximately right angles, or 90°, to each other. A single aperture 24 is formed in each side of shorter and wider arm 20, and spaced apertures 26, 28 are formed in each larger and narrower arm 22. As shown in the drawings, grid member 16 has a top portion thereof split into separate tubes 30, 32, having gaskets 34, 36, adhered to their upper surfaces. The tubes 30, 32 are secured to the arms 20, by fastening means 38 passing laterally through openings 40 formed at opposite ends of the tubes and into apertures 24.

If the connector/hanger bracket 14 is mounted in a corner, only one of each arm 20, 22 would be needed. While, if the connector/hanger bracket 14 is mounted against a wall, only three arms are needed. Additionally, one of the pair of tubes in the grid members 16, 18, would be eliminated, as needed.

A holding means or holder 42, for a light fixture, is secured to lower surfaces of the tubes 30, 32, as by means of attaching or securing means, such as screws (not shown). Sealing means 44, such as gaskets are held in slots 46 formed on a top surface 48 of the holding means 42. If lighting is required, a light tube 50 is electrically connected within holding means 42, and is preferably covered by an aerodynamically-shaped cover 52, preferably made from plastic, to allow light to pass therethrough. The shaped cover 52 is preferably releasably held in place in holding bracket 42, as by means of slots 54 formed in the cover, resiliently held in enlarged lower ends 56 of holding bracket 42. At partition wall locations, the holding means 42 is replaced by similar holding means specifically adapted to support a partition wall.

Each arm 22 has grid members 18 secured thereto. As shown in the drawings, the grid members are preferably formed from mating, aerodynamically-shaped tubes 58, 60, attached to opposite sides of the arms 22. However, the tubes 58, 60 could also be integrally formed. These tubes 58, 60 are supported by each arm 22, by fastening means 62, 64 passing laterally through aligned offset openings 66, 68, formed at the ends of the tubes 58, 60, into apertures 26, 28. Each of the tubes 58, 60 include sealing gaskets 70, 72 on a top supporting surface thereof, as well as sealing elements 74, 76, which cooperate or mate to seal the tubes 58, 60 in the assembled position (see FIG. 3).

It, therefore, can be seen that the bottom loading support system of the present invention provides a unique supporting system for substantially any type of air filter panel for a clean room. The system includes a plurality of easily inserted and removed grid members that are laterally secured to connector/hanger brackets, below the plane of the filter panel faces, held on spaced apart support rods.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A clean room air filter support system for supporting a plurality of filter elements, comprising:
   a plurality of spaced apart support rods secured to a supporting surface in a clean room;
   a connector/hanger bracket secured to each of the plurality of spaced apart support rods; the connector/hanger bracket including a plurality of different size arms, with each of the different size arms having at least one aperture formed therein;
   a plurality of supporting elements laterally secured to each connector/hanger bracket; and
   securing means for laterally securing the plurality of supporting elements to each connector/hanger bracket, below a lower face of the plurality of filter elements, away from the supporting surface, to allow the plurality of filter elements to be inserted in and removed from the air filter support system from inside a clean room.

2. The clean room air filter support system of claim 1, wherein the securing means are securing elements passing laterally through openings formed in the plurality of supporting elements and into the at least one aperture formed in each of the different size arms.

3. The clean room air filter support system of claim 2, wherein each of the plurality of supporting elements includes a sealing means on a top support surface thereof.

4. The clean room air filter support system of claim 3, wherein the plurality of supporting elements are arranged at approximately 90° to each other and one of the plurality of supporting elements has a light fixture and an aerodynamically shaped cover attached to a bottom surface thereof.

5. The clean room air filter support system of claim 4, further including an aerodynamically-shaped supporting tube forming a second of the plurality of supporting elements.

6. The clean room air filter support system of claim 5 wherein each of the plurality of supporting elements are cooperating pairs of supporting tubes.

7. The clean room air filter support system of claim 1 wherein one of the plurality of supporting elements includes a plurality of supporting tubes having sealing gaskets secured to top support surfaces thereof, and a holding element secured to lower surfaces of the supporting tubes for supporting a light fixture or partition wall.

8. The clean room air filter support system of claim 7 wherein first, shorter and wider, different size arms include separate sides having one aperture on each separate side, and second, longer and narrower, different size arms include two, laterally spaced apertures therein.

9. The clean room air filter system of claim 7 wherein lower edges of the plurality of supporting elements are aerodynamically-shaped to provide smooth air flow from air filter elements into a clean room.

10. The clean room air filter system of claim 9 wherein the securing means are securing elements passing laterally through openings formed in the plurality of supporting elements into the at least one aperture formed in each of the different size arms.

11. The clean room air filter support system of claim 10 wherein the plurality of supporting elements are arranged at approximately 90° to each other.

12. The clean room air filter support system of claim 7 wherein each of the plurality of supporting elements are cooperating pairs of supporting tubes.

13. The clean room air filter support system of claim 12 wherein the securing means are securing elements passing laterally through openings formed in the plurality of supporting elements and into the at least one aperture formed in each of the different size arms.

14. The clean room air filter support system of claim 13 wherein the plurality of supporting elements are arranged at approximately 90° to each other and one of the plurality of supporting elements has a light fixture and an aerodynamically shaped cover attached to a bottom surface thereof.

15. A clean room air filter support system for supporting a plurality of filter elements, comprising:

a plurality of spaced apart support rods secured to a supporting surface;

a connector/hanger bracket secured to each of the plurality of spaced apart support rods; the connector/hanger bracket including a plurality of different size arms, with each of the different size arms having at least one aperture formed therein;

a plurality of supporting elements arranged at approximately 90° to each other and having sealing means on a top surface thereof laterally secured to each connector/hanger bracket; and securing elements for laterally securing the plurality of supporting elements to each connector/hanger bracket, below a lower face of the plurality of filter elements, away from the supporting surface, to allow the plurality of filter elements to be inserted in and removed from the air filter support system from inside a clean room.

16. The clean room air filter support system of claim 15 wherein the securing elements pass laterally through openings formed in the plurality of supporting elements into at least one aperture formed in each of the different size arms.

17. The clean room air filter support system of claim 16 wherein a first of the plurality of supporting elements has a light fixture and an aerodynamically shaped cover attached to a bottom surface thereof and an aerodynamically shaped supporting tube forms a second of the plurality of supporting elements.

18. The clean room air filter support system of claim 17 wherein each of the plurality of supporting elements are cooperating pairs of supporting tubes and the plurality of different size arms include first, shorter and wider, different size arms with separate sides and one aperture in each separate side, and second, longer and narrower, different size arms with two, laterally spaced apertures therein.

19. The clean room air filter system of claim 15 wherein lower edges of the plurality of supporting elements are aerodynamically shaped to provide smooth air flow from air filter elements into a clean room and one of the plurality of supporting elements includes a light fixture holding element and an aerodynamically shaped cover releasably attached to the light fixture holding element.

20. A clean room air filter support system for supporting a plurality of filter elements, comprising:

a plurality of spaced apart support rods secured to a supporting surface;

a plurality of connector/hanger brackets secured to the plurality of spaced apart support rods; the plurality of connector/hanger brackets including a plurality of different size arms, including first, shorter and wider different size arms having separate sides with an aperture in the separate sides, and second, longer and narrower, different size arms with two, laterally spaced apertures;

a plurality of supporting elements laterally secured to the plurality of connector/hanger brackets, and a plurality of securing elements passing laterally through opening formed in the plurality of supporting elements and into the aperture and two laterally spaced apertures for laterally securing the plurality of supporting elements to the plurality of connector/hanger brackets below a lower face of the filter elements, away from the supporting surface, to allow the filter elements to be inserted in and removed from the air filter support system from inside a clean room.

* * * * *